UNITED STATES PATENT OFFICE 2,589,223

HYDROXY-TETRAHYDRO-NAPHTHOYL-ALKANOIC ACIDS

Robert R. Burtner, Skokie, Ill., assignor to G. D. Searle & Co., Chicago, Ill., a corporation of Illinois No Drawing. Application February 12, 1949, Serial No. 76,206

9 Claims. (Cl. 260—520)

This invention relates to hydroxy-tetrahydro-naphthoyl-alkanoic acids, to salts thereof and to processes for preparing such acids and salts. More particularly this invention relates to keto acids having the following general structural formula

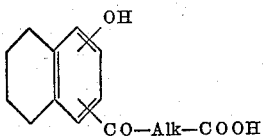

wherein Alk is an alkylene radical containing two to eight carbon atoms and wherein the hydroxyl radical and the keto alkanoic acid side chain are attached to the benzenoid ring of the tetrahydronaphthalene nucleus.

In the foregoing structural formula Alk represents bivalent, saturated, aliphatic hydrocarbon radicals of from two to eight carbon atoms. These radicals are derived from a straight-chained or branched-chained aliphatic hydrocarbon and include radicals such as ethylene, propylene, butylene and amylene, and polymethylene radicals such as trimethylene, tetramethylene, and related polymethylene radicals including octamethylene. In the structural formulas given in this application, where no double bonds are indicated in cyclic compounds, only single bonds are intended.

Most of the compounds which comprise this invention can be produced by reacting an alkyl ether of a tetrahydronaphthol of the general formula

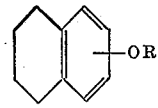

wherein R is a lower alkyl radical and wherein the radical OR is attached to any of the positions of the benzenoid ring, with a dibasic acid anhydride or halide derived from a saturated aliphatic dibasic acid containing 4 to 10 carbon atoms, in the presence of a Friedel-Crafts catalyst in an inert organic solvent. Catalysts which are suitable for such reactions include anhydrous aluminum chloride, anhydrous aluminum bromide, aluminum-sodium chloride, anhydrous ferric chloride, stannic chloride, boron trifluoride, anhydrous zinc chloride, hydrogen fluoride, and related substances. Inert solvents which are suitable for these reactions include nitrobenzene, chlorobenzene, carbon disulfide, tetrachloroethane, and similar solvents which are lower in reactivity than the starting alkoxy-tetrahydronaphthalene. Among the dibasic acid anhydrides and halides which can be used in the foregoing processes to prepare the substances of this invention are those derived from succinic, adipic, pimelic, suberic, sebacic, ethylsuccinic, glutaric, α-methylglutaric, β-methylglutaric, α-methyladipic and related dibasic acids. The resulting keto acid has the formula

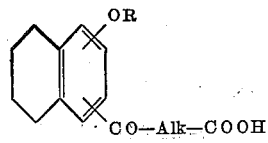

It can be dealkylated by reaction with anhydrous aluminum chloride or other Friedel-Crafts catalyst in inert solvents of the foregoing type, or by hydrolysis with aqueous concentrated halogen acid such as hydrobromic or hydriodic. The resulting hydroxy keto acid can be separated from the reaction mixture by extraction with alkali, followed by acidification, or by precipitation with aqueous acid, or other appropriate means.

Representative of the compounds which comprise this invention the following are:

A. β-(2-hydroxy -5,6,7,8- tetrahydro -1- naphthoyl)-propionic acid

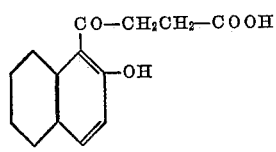

B. δ-(2-hydroxy -5,6,7,8- tetrahydro -1- naphthoyl)-valeric acid

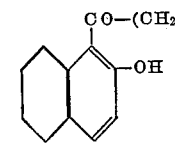

C. β-(1-hydroxy -5,6,7,8- tetrahydro -4- naphthoyl)-propionic acid

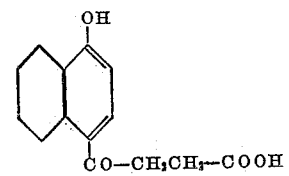

D. γ-(2-hydroxy -5,6,7,8- tetrahydro -1- naphthoyl)-isovaleric acid

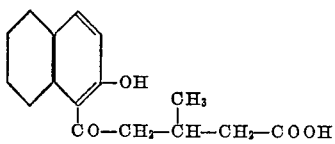

E. ω-(2-hydroxy,5,6,7,8- tetrahydro - 1 - naphthoyl)-pelargonic acid

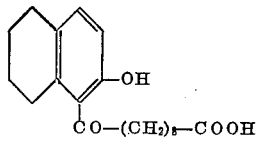

F. ω-(2-hydroxy-5,6,7,8- tetrahydro - 1 - naphthoyl)-heptanoic acid

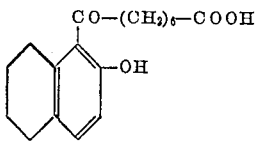

G. β-(1-hydroxy-5,6,7,8- tetrahydro - 2 - naphthoyl)-propionic acid

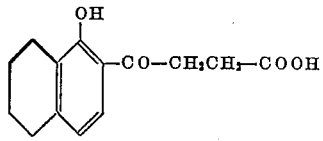

H. β-(1-hydroxy-5,6,7,8- tetrahydro - 4 - naphthoyl)-α-methylbutyric acid

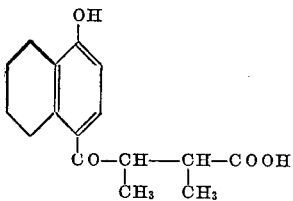

I. β-(3-hydroxy-5,6,7,8- tetrahydro - 2 - naphthoyl)-propionic acid

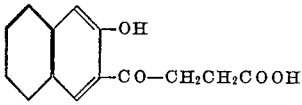

Salts of the acids which comprise my invention may be prepared by solution of the acid in an alkaline carbonate solution, such as sodium carbonate, followed by salting-out with a salt, as for example sodium chloride. Likewise such salts may be prepared by treatment of an alcoholic solution of the acid with an alcoholic solution of a base. The salts are often insoluble in the alcohol and may be obtained as precipitates. In other cases another solvent such as ether or benzene may be added to throw down the salts. Salts of ammonia or aliphatic amines may be obtained by treating a solution of the acid in an organic solvent with a solution of the amine in a similar solvent and precipitating the desired salt with another miscible solvent in which the salt is insoluble. Water-soluble amines are preferred for salt formation, among them being the lower alkyl, dialkyl and trialkylamines as well as alkanolamines.

The compounds of this invention are useful as therapeutic agents. They are also valuable as intermediates in the synthesis of complex organic compounds. Certain of the compounds are also of use as antiseptics, mold inhibitors, fungicides, and as components of insecticides.

This invention is further disclosed by the following examples which are provided for the purpose of illustrating the invention and are not to be construed as limiting the invention in spirit or scope. It will be apparent to those skilled in the art that many modifications may be made in the processes, as well as in the claimed compounds, without departing from the intent and purpose of this invention. Amounts of materials are given in parts by weight.

*Example 1*

A. A solution of 486 parts of 5,6,7,8-tetrahydro-2-methoxynaphthalene and 330 parts of succinic anhydride in 2950 parts of nitrobenzene is cooled to about 5° centigrade and 800 parts of anhydrous aluminum chloride are added with agitation at 5–7° C. during forty minutes. The mixture is agitated for one hour longer at about 5° C. and then allowed to stand at room temperature for 100 hours. It is then poured into an excess of ice and hydrochloric acid and the solvent is removed by steam distillation. The residue is chilled and the solid is removed by filtration. The solid is taken up in 10,000 parts of hot water containing 400 parts of sodium carbonate and the solution is warmed to 85° C. and filtered with decolorizing charcoal. The cooled filtrate is acidified and the light brown granular precipitate is collected on a filter, washed with water, and dried at 65° C. It is recrystallized from 4500 parts of acetic acid using decolorizing charcoal and tan crystals of β-(2-methoxy-5,6,7,8-tetrahydro-3-naphthoyl)propionic acid are obtained. After recrystallization from methanol using decolorizing charcoal, this acid forms colorless needles which melt with decomposition at 173–175° C.

B. 50 parts of the foregoing acid are suspended in 400 parts of chlorobenzene at 60° C. and 100 parts of anhydrous aluminum chloride are added. The mixture is stirred at 60° C. for about thirty minutes and then poured into an excess of ice and hydrochloric acid. The solvent is removed by steam distillation. The residue is chilled and the solid precipitate removed by filtration. The solid is dissolved in 1500 parts of hot water containing 20 parts of sodium hydroxide, treated with decolorizing charcoal and filtered. The cooled filtrate is acidified and the precipitate of β-(2-hydroxy-5,6,7,8-tetrahydro-3- naphthoyl)propionic acid (Compound I) soon granulates. This is collected on a filter, washed with water, and dried. Recrystallization from benzene gives colorless needles which melt at 142° C. A further recrystallization from toluene gives crystals melting at 143.5° C.

C. When 430 parts of adipic anhydride are reacted with 486 parts of 5,6,7,8-tetrahydro-2-methoxynaphthalene in the presence of 800 parts of anhydrous aluminum chloride according to the method of Example 1A, there is produced δ-(2-methoxy-5,6,7,8-tetrahydro - 3 - naphthoyl) valeric acid. 55 parts of this acid on demethylation with 400 parts of anhydrous aluminum chloride by the procedure of Example 1B, followed by purification by steam distillation, extraction with alkali and subsequent acidification, and crystallization, is converted to δ-(2-hydroxy-5,6,7,8-tetrahydro-3-naphthoyl) valeric acid.

*Example 2*

20 parts of β-(1-methoxy-5,6,7,8-tetrahydro-4-naphthoyl)propionic acid in 150 parts of chlorobenzene are demethylated with 40 parts of anhydrous aluminum chloride at room temperature. The reaction is exothermic and the temperature of the reaction rises to about 45-50° C. The reaction mixture is stirred at 60° C. for 30 minutes. β-(1-hydroxy-5,6,7,8-tetrahydro-4-naphthoyl) propionic acid (Compound C) is isolated by the method of Example 1. On recrystallization from 35% alcohol followed by extraction with boiling toluene, this acid melts at 186-187° C. The melting point of a mixture of this acid with a mixture of the starting acid (melting point 177° C.) was 160-165° C.

By reacting 128 parts of β-methylglutaric anhydride with 146 parts of 5, 6, 7, 8-tetrahydro-2-methoxynaphthalene in 886 parts of nitrobenzene at about 5° C. by the method of Example 1A, there is produced γ-(2-methoxy-5,6,7,8-tetrahydro-3-naphthoyl)isovaleric acid. This acid is demethylated and the hydroxy acid is isolated by alkaline extraction by the method of Example 1B. On acidification of the alkaline extract there is obtained γ-(2-hydroxy-5,6,7,8-tetrahydro-3-naphthoyl)isovaleric acid.

Example 3

A solution of 100.8 parts of bromine and 300 parts of glacial acetic acid is added to an agitated suspension of 78.6 parts of β-(1-methoxy-5,6,7,8-tetrahydro-4-naphthoyl)-propionic acid in 300 parts of glacial acetic acid at 50-55° C. over a period of 30 minutes. Heating with agitation at 55° C. is continued for one hour longer. Then the solvent is removed under vacuum at 50-55° C. and the residue partially crystallizes on standing. It is dissolved in 200 parts of hot benzene and chilled. The precipitate of β-bromo-β-(1-methoxy-5,6,7,8-tetrahydro-4-naphthoyl)propionic acid is collected on a filter, washed with benzene, and dried. The crude acid so obtained is used directly in the next step without purification. It contains some of the nuclear brominated acid.

22.5 parts of the above acid are suspended in 85 parts of hot glacial acetic acid containing 7.8 parts of fused sodium acetate. The suspension is refluxed for 20 minutes during which time the acid goes into solution. The hot mixture is poured into 500 parts of ice water and the granular precipitate is collected on a filter, washed with water, and dried at 65° C. After recrystallization from methanol and ethyl acetate, using decolorizing charcoal, β-(1-methoxy-5,6,7,8-tetrahydro-4-naphthoyl)acrylic acid forms yellow needles melting at 178° C. The melting point of the mixture of this acid with the starting acid is 150-155° C.

Example 4

To a solution of 22 parts of succinic anhydride in 225 parts of nitrobenzene at 50-60° C. are added 38 parts of 1-acetoxy-5,6,7,8-tetrahydronaphthalene. The solution is chilled to about 0° C. and 59 parts of anhydrous aluminum chloride are added portionwise with stirring over a period of 30-40 minutes, the temperature being kept below 5° C. The mixture is then agitated for 2 hours while the temperature is allowed to rise to about 20° C. The mixture is decomposed by quenching in 500 parts of ice water containing 60 parts of muriatic acid. The solvent is removed by steam distillation and the oily residue is separated and dissolved in 500 parts of 4% sodium carbonate solution, treated with activated charcoal, filtered, chilled and acidified. The precipitate of β-(1-acetoxy-5,6,7,8-tetrahydro-2-naphthoyl)-propionic acid is separated and dried. This acid is hydrolyzed by refluxing with 4 parts of muriatic acid for 3 hours. The hot suspension is quenched in ice water and the precipitate of β-(1-hydroxy-5,6,7,8-tetrahydro-2-naphthoyl)propionic acid (Compound G) is isolated and dried. It may be purified by recrystallization from isopropanol.

Example 5

To a solution of 525 parts of 1-methoxy-5,6,7,8-tetrahydronaphthalene and 314 parts of maleic anhydride in 6400 parts of s-tetrachloroethane at 0-2° C. are added portionwise with good agitation 858 parts of anhydrous aluminum chloride over a period of ½-1 hour. The mixture is agitated at about 0° C. for several hours and kept at about 0° C. for several days. The reaction mixture is quenched in an excess of ice and acid, the solvent is distilled off with steam, and the residue is chilled and decanted. The viscous yellow oily product is taken up in 20,000 parts of 2.5% sodium carbonate solution at 20° C., filtered and acidified. The precipitate of β-(1-methoxy-5,6,7,8-tetrahydro-4-naphthoyl)acrylic acid granulates on standing. It is separated and dried, and then recrystallized from methanol; M. P. 178° C. This material is identical with that of Example 3.

Example 6

To a solution of 202 parts of sebacic anhydride and 162 parts of 2-methoxy-5,6,7,8-tetrahydronaphthalene in 1000 parts of nitrobenzene at 2-5° C. are added over 30 minutes with good agitation 265 parts of anhydrous aluminum chloride. The temperature is kept below 7° C. during the addition and for 2 hours longer. The reaction mixture is allowed to stand at room temperature for 2 days. It is then heated to 60-70° C. with good agitation for 1 hour and poured into an excess of ice and muriatic acid. The solvent is removed by steam distillation and the residue is removed by decantation. It is dissolved in boiling 2% caustic soda solution, treated with activated charcoal, filtered and chilled. The solution is acidified and the precipitate of ω-(2-hydroxy-5,6,7,8-tetrahydro-3-naphthoyl)pelargonic acid is separated and dried.

I claim:

1. A member of the group consisting of a hydroxy-tetrahydronaphthoylalkanoic acid of the formula

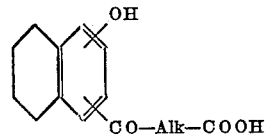

wherein Alk is a lower alkylene radical containing at least two carbon atoms, and alkali metal salts thereof.

2. A hydroxy-tetrahydronaphthoylalkanoic acid of the formula

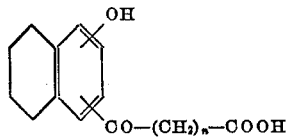

wherein $n$ is an integer from two to eight.

3. A hydroxy - tetrahydronaphthoylalkanoic acid of the formula

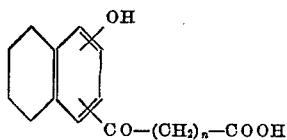

wherein $n$ is an integer from two to eight

4. A hydroxy - tetrahydronaphthoylpropionic acid of the formula

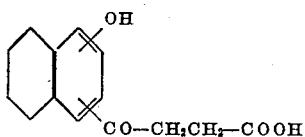

5. β-(2-hydroxy-5,6,7,8-tetrahydro-3-naphthoyl)-propionic acid.

6. β-(1-hydroxy-5,6,7,8-tetrahydro-4-naphthoyl)-propionic acid.

7. β-(1-hydroxy-5,6,7,8-tetrahydro-2-naphthoyl)-propionic acid.

8. The process of producing a hydroxy-tetrahydronaphthoylalkanoic acid which comprises reacting an alkoxytetrahydronaphthalene with a member of the group consisting of acid anhydrides and acid halides derived from aliphatic dibasic acids containing four to ten carbon atoms, in the presence of a Friedel-Crafts catalyst, dealkylating the keto acid thus formed, and separating from the reaction mixture the hydroxytetrahydronaphthoylalkanoic acid.

9. The process of producing a hydroxy-tetrahydronaphthoylpropionic acid which comprises reacting an alkoxy-tetrahydronaphthalene with succinic anhydride in the presence of anhydrous aluminum chloride, dealkylating the keto acid thus formed with anhydrous aluminum chloride, and separating the hydroxy-tetrahydronaphthoylalkanoic acid.

ROBERT R. BURTNER.

REFERENCES CITED

The following references are of record in the file of this patent:

Krollpfeiffer et al., Chem. Abstracts, vol. 17, p. 2422 (1923).

Fiester et al., J. Am. Chem. Soc., vol. 54, pp. 4347–4356 (1932).

Wahl, Chem. Abstracts, vol. 32, col. 4160 (1938).